(12) United States Patent
Xu et al.

(10) Patent No.: US 12,342,414 B2
(45) Date of Patent: Jun. 24, 2025

(54) SYSTEMS AND METHODS FOR DYNAMIC EDGE DISCOVERY IN A WIRELESS NETWORK

(71) Applicant: Verizon Patent and Licensing Inc., Basking Ridge, NJ (US)

(72) Inventors: Kevin Xu, Warren, NJ (US); Charles P. Szrom, Branchburg, NJ (US); Valerie Feldmann, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 403 days.

(21) Appl. No.: 17/933,158

(22) Filed: Sep. 19, 2022

(65) Prior Publication Data

US 2024/0098474 A1    Mar. 21, 2024

(51) Int. Cl.
*H04W 8/14*     (2009.01)
*H04W 8/00*     (2009.01)
*H04W 76/10*    (2018.01)
*H04W 76/20*    (2018.01)

(52) U.S. Cl.
CPC ........... *H04W 8/005* (2013.01); *H04W 76/10* (2018.02)

(58) Field of Classification Search
CPC ........ H04W 8/005; H04W 76/10; H04W 8/08
See application file for complete search history.

(56) References Cited

U.S. PATENT DOCUMENTS

| | | | | |
|---|---|---|---|---|
| 11,979,367 B2 * | 5/2024 | Zhang | ................ | H04L 61/4511 |
| 2020/0186462 A1 * | 6/2020 | D'Acunto | ............. | H04L 45/306 |
| 2023/0224272 A1 * | 7/2023 | Zhang | ................ | H04L 63/02 |
| | | | | 709/226 |
| 2023/0354460 A1 * | 11/2023 | Watfa | ................... | H04W 76/11 |
| 2024/0056415 A1 * | 2/2024 | Tang | ................... | H04L 61/4511 |

FOREIGN PATENT DOCUMENTS

WO    WO-2019229492 A1 * 12/2019 ........... H04L 67/146

OTHER PUBLICATIONS

3GPP TSG-RAN WG1#76, R1-140471 Title:Comparsion of LTE Discovery with other discovery trechnologies (Year: 2014).*

(Continued)

*Primary Examiner* — Faruk Hamza
*Assistant Examiner* — Abusayeed M Haque (57) ABSTRACT

A system described herein may provide a technique for receiving a communication session request associated with a particular User Equipment ("UE"). The system may identify locator information associated with an edge discovery system associated with a network that includes a plurality of edge devices, wherein the edge discovery system receives service requests associated with one or more UEs and provides an indication of a respective edge device of the plurality of edge device in response to respective service requests. The system may output, in response to the communication session request, the locator information associated with the edge discovery system, wherein the particular UE communicates with the edge discovery system using the locator information to output a particular service request and receive, from the edge discovery system, an indication of a particular edge device of the plurality of edge devices in response to the particular service request.

20 Claims, 9 Drawing Sheets

(56) References Cited

OTHER PUBLICATIONS

Third Generation Partnership Project, "Technical Specification Group Core Network and Terminals; Mobile radio Interface Layer 3 specification; Core network protocols; Stage 3 (Release 17)," 3GPP TS 24.008 V17.7.0 (Jun. 2022), available at https://www.3gpp.org/ftp/Specs/archive/24_series/24.008/24008-h70.zip.

Third Generation Partnership Project, "Technical Specification Group Core Network and Terminals; Non-Access-Stratum (NAS) protocol for Evolved Packet System (EPS); Stage 3 (Release 17)," 3GPP TS 24.301 V17.7.0 (Jun. 2022), available at https://www.3gpp.org/ftp/Specs/archive/24_series/24.301/24301-h70.zip.

* cited by examiner

SYSTEMS AND METHODS FOR DYNAMIC EDGE DISCOVERY IN A WIRELESS NETWORK

BACKGROUND

Wireless networks may utilize edge computing devices that are deployed in geographically diverse locations in order to provide services, such as low-latency services, to User Equipment ("UEs") such as mobile telephones, Internet of Things ("IoT") devices, tablets, etc. that are located in different regions. UEs may query one or more devices of the network, which may assign or select a particular edge device to provide services to respective UEs based on location or other factors.

DETAILED DESCRIPTION OF EXAMPLE EMBODIMENTS

The following detailed description refers to the accompanying drawings. The same reference numbers in different drawings may identify the same or similar elements.

Figure 1:
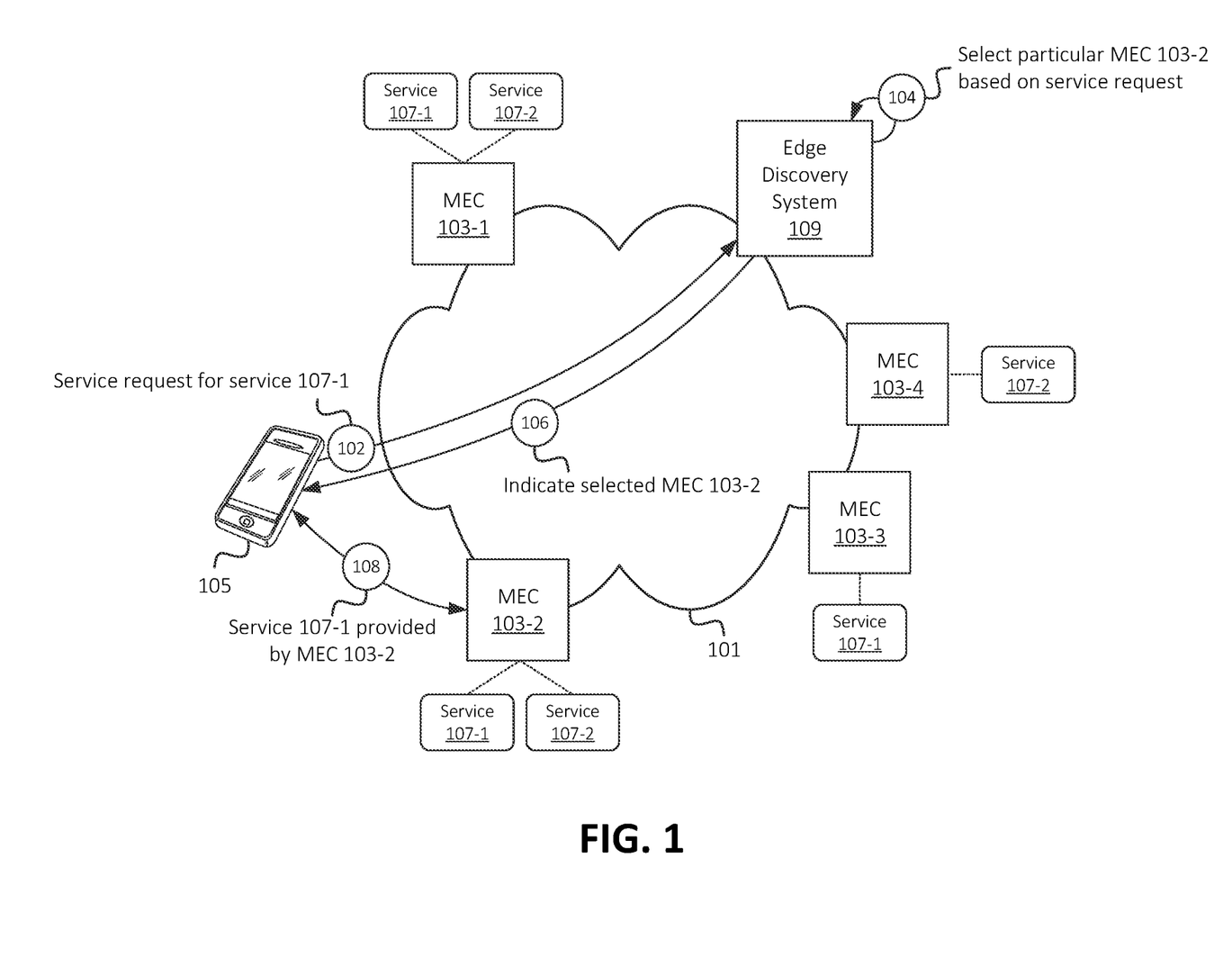
FIG. 1 illustrates an example overview of an edge discovery system.

As shown in FIG. 1, a network 101 may include and/or may be communicatively coupled to a set of edge devices, such as Multi-Access/Mobile Edge Computing ("MEC") devices 103, referred to sometimes herein simply as a "MECs 103." Edge devices, such as MECs 103, may be deployed at hardware resources that are located at geographically distinct locations, such as at or near base stations or other wireless network infrastructure via which UEs, such as UE 105, receive wireless connectivity to network 101. Each MEC 103 may include or implement services, applications, or other containerized functions (referred to herein simply as "services 107"). Such services may, in some situations, include latency-sensitive services such as augmented reality ("AR") services, autonomous or semi-autonomous vehicle control services, automated factory robot control services, or other types of services. When UE 105 receives services from a given MEC 103, traffic associated with such services may not need to traverse, be routed through, etc. a core of network 101 as the services may be provided by a given MEC 103.

Each MEC 103 may be associated with a particular set of services 107. For example, as shown, MECs 103-1 and 103-2 may be associated with services 107-1 and 107-2. For example, services 107-1 and 107-2 may have been installed, instantiated, activated, etc. at MECs 103-1 and 103-2. As further shown, MEC 103-3 may be associated with service 107-1, and MEC 103-4 may be associated with service 107-2.

When attempting to receive a particular service 107 (e.g., service 107-1), UE 105 may output (at 102) a service request to Edge Discovery System ("EDS") 109, which may maintain information regarding MECs 103, such as locations of MECs 103, particular services 107 installed or otherwise available at MECs 103, rules or policies relating to selecting MECs 103 in response to service requests, etc. In some embodiments, the service request (sent at 102) may include information that may be used by EDS 109 to select a particular MEC 103 to fulfill the service request, such as an identifier or other indication of the requested service 107-1, one or more identifiers of UE 105 (e.g., a Subscription Permanent Identifier ("SUPI"), a Globally Unique Temporary Identifier ("GUTI"), an International Mobile Station Equipment Identity ("IMEI") value, a Mobile Directory Number ("MDN"), etc.), a geographical location of UE 105, Quality of Service ("QoS") information such as an identifier of a particular network slice, Service Level Agreement ("SLA") information, etc. In some embodiments, UE 105 may include or implement an application programming interface ("API"), a client, or other suitable communication pathway or mechanism by which UE 105 is able to communicate with EDS 109. For example, in accordance with some embodiments and as described in further detail below, UE 105 may receive an Internet Protocol ("IP") address, Fully Qualified Domain Name ("FQDN"), a Uniform Resource Locator ("URL"), a Uniform Resource Identifier ("URI"), and/or other suitable locator information via which UE 105 is able to identify and communicate with EDS 109.

EDS 109 may select (at 104) a particular MEC 103 to fulfill the service request. In this example, EDS 109 may select MEC 103-2 to fulfill the service request, based on factors such as the requested service 107-1 being installed at (or otherwise available at) MEC 103-2, MEC 103-2 being geographically proximate (e.g., closest) to UE 105, load metrics associated with MEC 103-2 and/or other MECs 103, and/or other factors. EDS 109 may accordingly provide (at 106) an indication of the selected MEC 103-2, which may include providing an IP address or other suitable locator information associated with MEC 103-2 to UE 105. In some embodiments, EDS 109 may perform other operations based on the request, such as notifying MEC 103-2 that MEC 103-2 has been selected to provide services to UE 105, instructing MEC 103-2 to install or activate the requested service 107-1, etc. Based on receiving (at 106) the indication of the selected MEC 103-2, UE 105 may communicate (at 108) with MEC 103-2 to receive the service. For example, one or more applications associated with UE 105 may specify MEC 103-2 as a communication endpoint for communications, associated with service 107-1, to and/or from UE 105. In this manner, UE 105 may receive the requested service 107-1 in accordance with SLAs, QoS parameters, load balancing considerations, etc., as provided by EDS 109.

Figure 2:
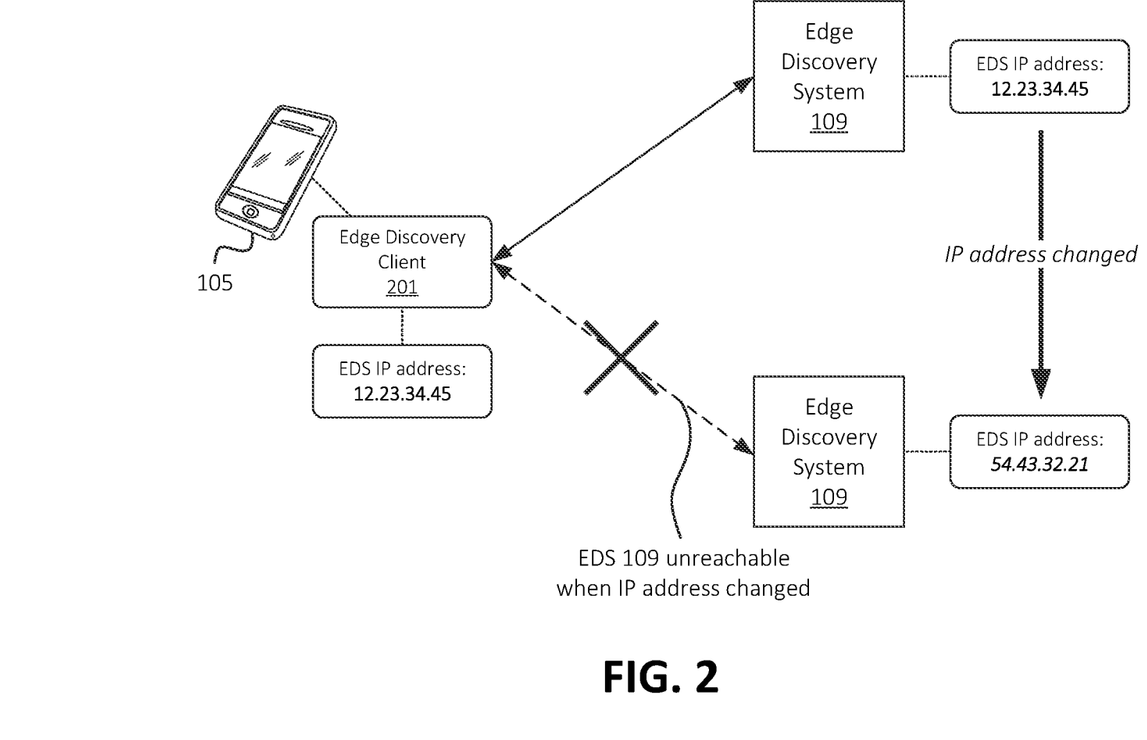
FIG. 2 illustrates an example situation in which locator information associated with an edge discovery system may change.

As noted above, in some embodiments, UE 105 may implement one or more APIs, clients, etc. that communicate with EDS 109. For example, as shown in FIG. 2, UE 105 may include, implement, etc. edge discovery client 201, which may be configured to communicate with EDS 109. In some implementations, edge discovery client 201 may be "hard coded" or otherwise configured with locator information, such as an IP address, for EDS 109. In such implementations, if the locator information for EDS 109 changes (e.g., from the example IP address 12.34.45.56 to the example IP address 54.43.32.21), edge discovery client 201 may be unable to communicate with EDS 109 unless edge discovery client 201 is updated with the new IP address for EDS 109. The IP address for EDS 109 may have changed due to, for example, network topology changes, a failover of EDS 109 from one set of hardware resources to another, an upgrade of resources used to implement EDS 109, and/or other types of changes or events.

Although the above example describes edge discovery client 201 in the context of a single EDS 109, edge discovery client 201 may, in some embodiments, maintain locator information for multiple EDSs 109. For example, different networks 101 may each be associated with a respect EDS 109, and edge discovery client 201 may maintain information associating each network 101 with a different EDS 109, along with respective associated locator information for each EDS 109.

Embodiments described herein provide for dynamically provided locator information, associated with EDS 109, to UEs 105 in order to account for such changes or other situations. As discussed below, for example, some embodiments may provide locator information for EDS 109 when UE 105 requests establishment or modification of a communication session (e.g., a protocol data unit ("PDU") session) associated with a given service 107, in order to provide up-to-date locator information for EDS 109 in real time or near-real time. As such, the scalability and reliability of EDS 109 may be enhanced in accordance with embodiments described herein.

Figure 3:
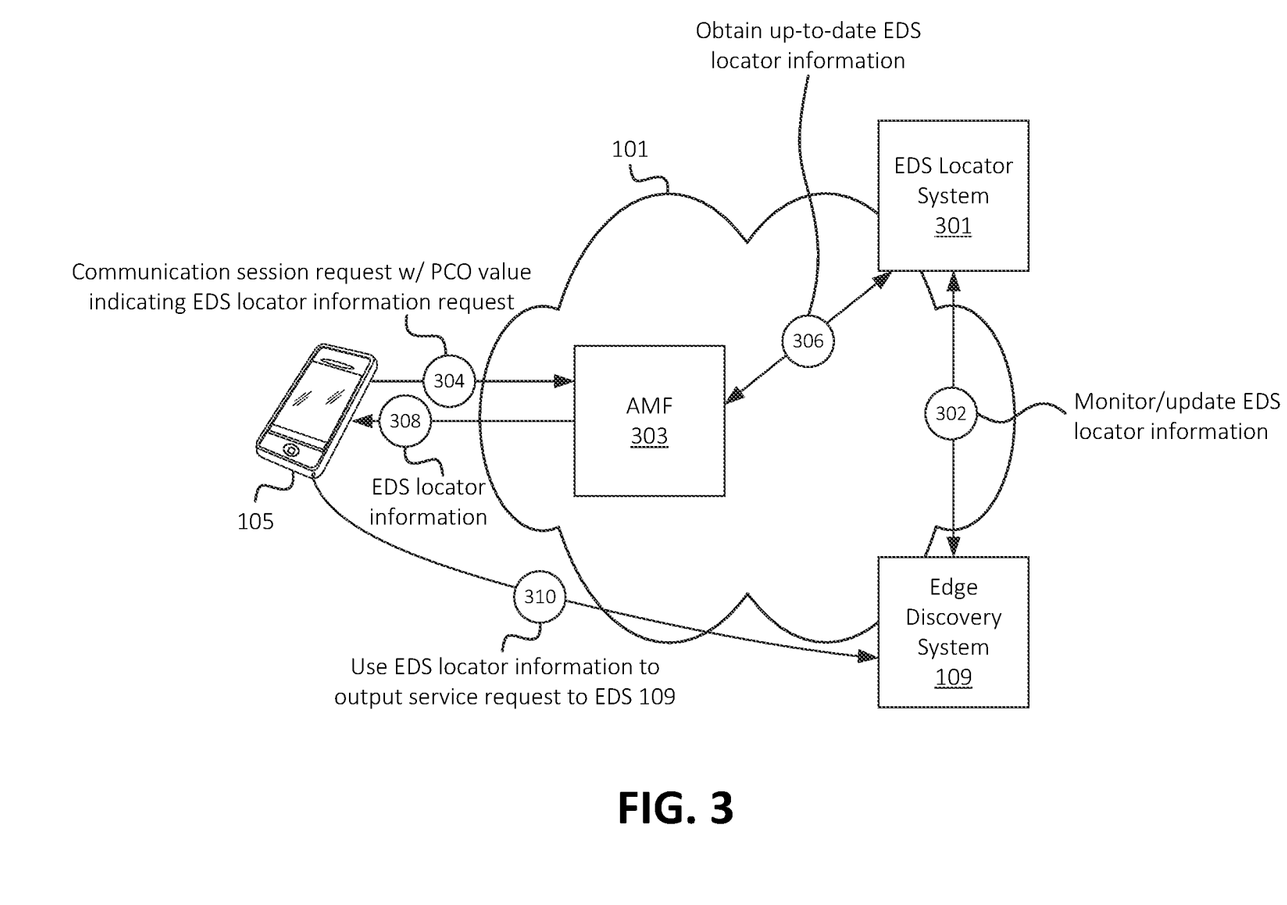
FIG. 3 illustrates an example of providing up-to-date edge discovery system locator information to a UE, in accordance with some embodiments.

As shown in FIG. 3, EDS Locator System ("ELS") 301 may monitor and/or update (e.g., on an ongoing basis) locator information (e.g., IP addresses, URLs, etc.) associated with EDS 109. For example, ELS 301 and EDS 109 may communicate via an API or other suitable communication pathway. EDS 109 and/or some other suitable device or system may, for example, provide locator information associated with EDS 109 to ELS 301 on a periodic or intermittent basis, and/or on an event-driven basis, such as instances where such locator information changes or is updated. In this manner, ELS 301 may maintain up-to-date locator information via which EDS 109 may be reached, communicated with, accessed, etc. (e.g., by UE 105).

At some point, UE 105 may output (at 304) a communication session request to one or more elements of network 101, such as Access and Mobility Management Function ("AMF") 303. Such communication request may include, and/or may be part of, an initial connection of UE 101 to a RAN (e.g., a RAN included in or communicatively coupled to network 101), an initial communication request by an application with which a particular service 107 is associated, and/or some other type of communication session request. In some embodiments, the communication session request may include, and/or may be included in, a protocol data unit ("PDU") Session Establishment Request, a Packet Data Network ("PDN") Connectivity Request, and/or some other suitable type of communication session request. In some embodiments, the communication request may include one or more flags, fields, etc. indicating that UE 105 is requesting locator information for an EDS 109 associated with network 101.

For example, the communication request may include one or more Protocol Configuration Options ("PCO") values, codes, etc., via which UE 105 may request locator information for EDS 109. In some embodiments, the communication request may include one or more other PCO values in addition to the request for locator information for EDS 109. For example, the communication request may include a PCO value denoting a request for an IP address that may be used by UE 105 to communicate with network 101, and/or other PCO values. In some embodiments, the PCO values may include 5-character hexadecimal values, of which one or more values may be "reserved," undefined, non-standard, or otherwise flexible. In one example, hexadecimal values FF00H through FFFFH may be available to be used in such a manner, and UE 105 and/or ELS 301 (and/or one or more other elements of network 101) may use a particular one of such values to request and provide locator information for EDS 109.

In some embodiments, UE 105 may output (at 304) the communication session request to AMF 303 via an N1 interface, via Non-Access Stratum ("NAS") signaling, etc. Based on receiving the communication session request, AMF 303 may identify that the communication session requests includes a request for locator information for EDS 109. In some embodiments, the communication session request (received at 304) may not specifically include a request for locator information for EDS 109, and AMF 303 may nevertheless determine that such information should be provided to UE 105. For example, in some embodiments, a network operator associated with network 101 may configure UE 105 and/or network 101 such that EDS 109 locator information is provided in response to all communication session requests, even if such requests do not specifically request EDS 109 locator information.

AMF 303 may obtain (at 306) up-to-date locator information for EDS 109 from ELS 301. For example, AMF 303 may request such information from ELS 301 based on receiving (at 304) the communication session request from UE 105. Additionally, or alternatively, AMF 303 may receive such information from ELS 301 independently of receiving communication session requests. For example, AMF 303 may request the information periodically or intermittently (or on some other basis) from ELS 301, and/or ELS 301 may "push" locator information to AMF 303 on an ongoing basis (e.g., periodically, intermittently, based on receiving (at 302) updated locator information, etc.). In some embodiments, AMF 303 may communicate with ELS 301 via an API, via a Network Exposure Function ("NEF"), via a Service Capability Exposure Function ("SCEF"), and/or some other device or system. In some embodiments, as discussed below, AMF 303 may receive (at 306) up-to-date EDS 109 locator information from one or more other devices or systems, such as a Session Management Function ("SMF").

Based on obtaining (at 306) the up-to-date locator information for EDS 109, AMF 303 may provide (at 308) the locator information for EDS 109. For example, AMF 303 may provide the locator information in a PCO field, information element ("IE"), etc. associated with a PCO value that denotes EDS 109 locator information. In some embodiments, the PCO value included in the response (at 308) may be the same PCO value included in the request (at 304), where the same PCO value may be used by UE 105 to identify that the accompanying field or IE is locator information for EDS 109. In some embodiments, the response (at 308) may be, may include, and/or may be included in a PDU Session Establishment Accept message or some other suitable message. In some embodiments, the response (at 308) may include other information requested via one or more PCO values (included in the request at 304), such as an IP address of UE 105, a PDU session identifier, QoS information, and/or other suitable information.

In some embodiments, UE 105 may update information at edge discovery client 201 to reflect the received locator information for EDS 109. UE 105 (e.g., edge discovery client 201) may accordingly use (at 310) the EDS 109 locator information to communicate with EDS 109. For example, UE 105 may issue a service request (e.g., as similarly discussed above with respect to FIG. 1) to EDS 109 by using the locator information of EDS 109 to communicate with EDS 109 via network 101. As similarly discussed above, EDS 109 may select a suitable MEC 103 to fulfill the service request, and UE 105 may accordingly communicate with the selected MEC 103 in order to receive the requested service 107.

Figure 4:
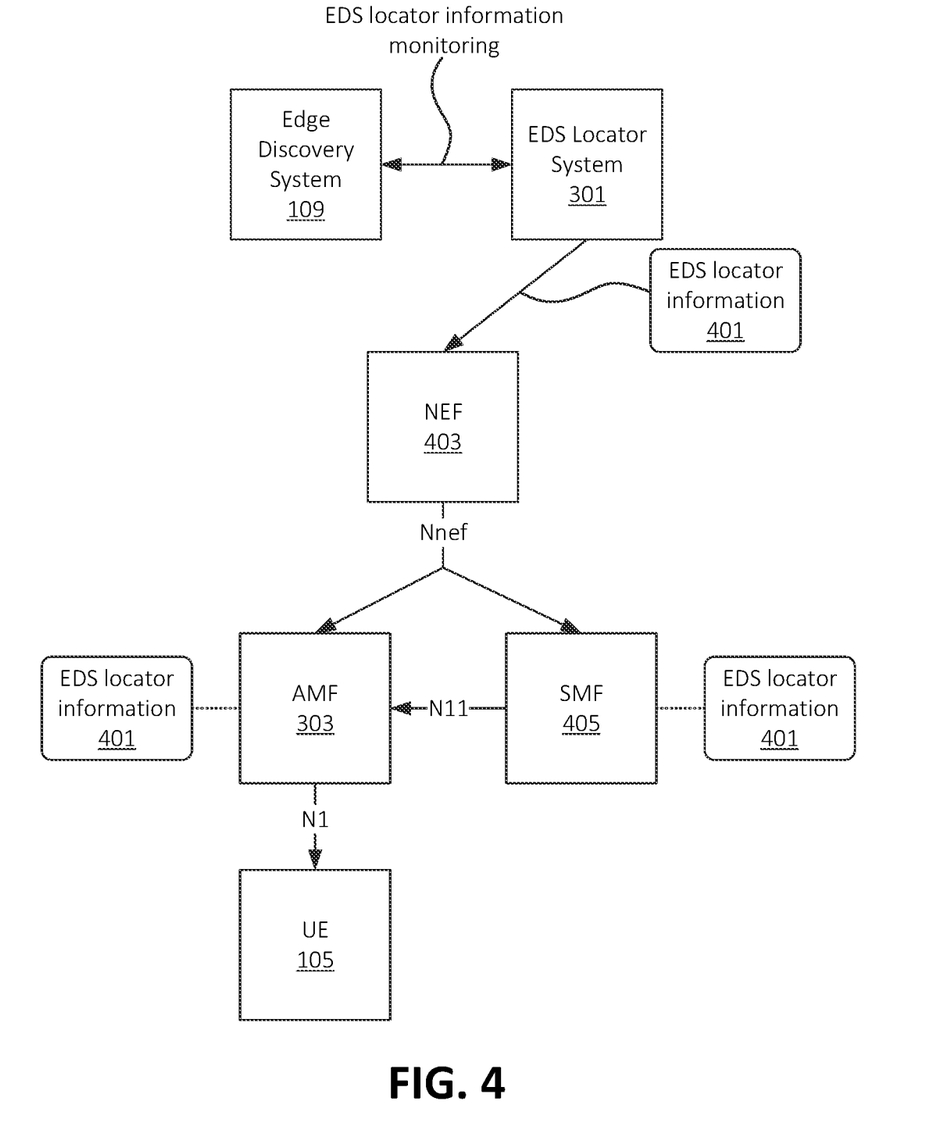
FIG. 4 illustrates example communication pathways for providing up-to-date edge discovery system locator information to a UE, in accordance with some embodiments.

FIG. 4 illustrates example communication pathways via which one or more elements of network 101 and/or UE 105 may receive EDS 109 locator information. For example, as shown, ELS 301 may receive locator information 401, associated with EDS 109, from EDS 109 via an API or other suitable communication pathway. In some embodiments, ELS 301 may receive locator information 401, associated with EDS 109, from some other device or system, such as a routing element that assigns locator information to EDS 109 (e.g., a Dynamic Host Configuration Protocol ("DHCP") server), a network orchestration and/or management system, a User Plane Function ("UPF"), a PDN Gateway ("PGW"), and/or some other suitable source. In some embodiments, ELS 301 may include, may be implemented by, and/or may otherwise be associated with a UPF, a PGW, and/or some other network element of network 101.

ELS 301 may provide locator information 401 to, or via, an interface and/or exposure element of network 101, such as NEF 403. In some embodiments, NEF 403 may maintain authentication and/or authorization information that may indicate that ELS 301 is authorized to provide information (e.g., locator information 401 associated with EDS 109) to one or more elements of network 101. Additionally, or alternatively, NEF 403 may receive requests for locator information 401 from one or more elements of network 101, and may forward such requests to ELS 301.

For example, NEF 403 may communicate with AMF 303 and/or SMF 405 via an Nnef interface or some other suitable communication pathway. In some embodiments, NEF 403 may forward (e.g., via an Nnef interface) EDS locator information 401 to AMF 303 and/or SMF 405 based on receiving such information (e.g., from ELS 301). As such, in some embodiments, AMF 303 may receive EDS locator information 401 from NEF 403. Additionally, or alternatively, in some embodiments, AMF 303 may receive EDS locator information 401 from SMF 405 (e.g., via an N11 interface). For example, based on receiving a communication session request (e.g., a PDU Session Establishment Request) from UE 105, AMF 303 may participate in a session establishment procedure in which AMF 303 outputs (e.g., via an N11 interface) a session or context creation message to SMF 405, such as a Nsmf_PDU_Session_CreateSMContext Request or other suitable type of message. In such embodiments, SMF 405 may provide EDS locator information 401 to AMF 303 via a session or context creation confirmation or information message, such as a Nsmf_PDU_Session_CreateSMContext Response or other suitable type of message. As discussed above, UE 105 may receive EDS locator information 401 from AMF 303 via an N1 interface or other suitable type of communication pathway.

In some embodiments, ELS 301 may provide EDS locator information 401 to one or more network elements of network 101 (e.g., via NEF 403) in addition to, or in lieu of, AMF 303 and/or SMF 405. In some embodiments, ELS 301 may provide EDS locator information 401 to a UE information repository of network 101, such as a Unified Data Management function ("UDM"), which may provide some or all of EDS locator information 401 to SMF 405 (e.g., via an N10 interface) and/or to AMF 303 (e.g., via an N8 interface).

Figure 5:
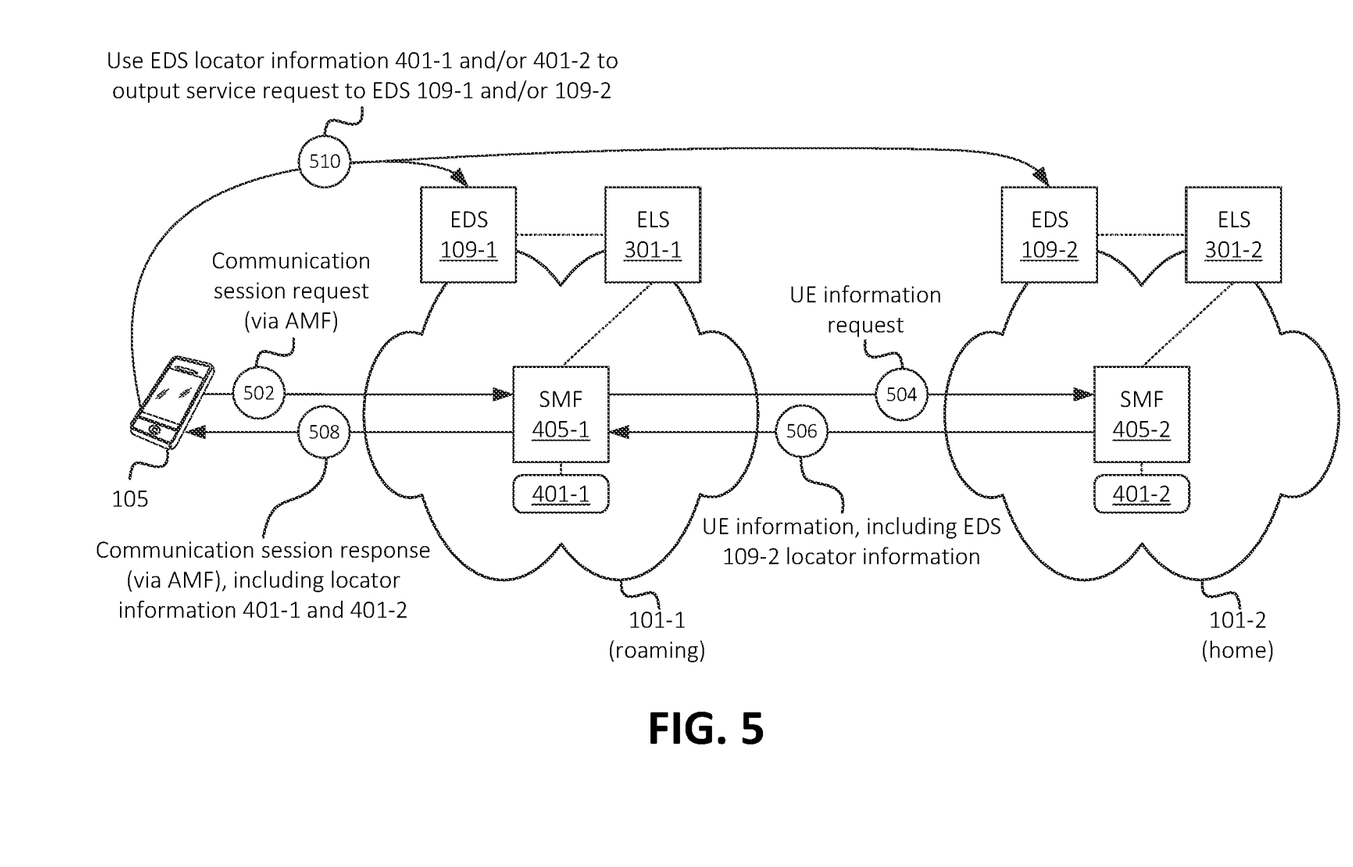
FIG. 5 illustrates an example of providing edge discovery system locator information to a UE in a roaming network, in accordance with some embodiments.

In some embodiments, one network 101 may receive EDS 109 locator information from another network 101. For example, as shown in FIG. 5, assume that UE 105 is connected to, or is otherwise communicatively coupled to, network 101-1, which may be a "roaming" network with respect to UE 105. For example, UE 105 may indicate, to a particular AMF 303 of network 101-1 (and/or to some other element of network 101-1) that UE 105 is registered with, is provisioned with, etc. network 101-2 as its "home" network. Home network 101-2 may, for instance, maintain subscriber or UE information associated with UE 105, may generate or maintain charging information associated with UE 105, etc.

As shown, UE 105 may output (at 502) a communication session request to roaming network 101 (e.g., to or via a respective AMF 303 of network 101-1). For the sake of simplicity, FIG. 5 shows the request as being provided from UE 105 to SMF 405-1. In practice, in some embodiments, the request may be provided from UE 105 to a particular AMF 303 of network 101-1, which may forward the request and/or otherwise indicate to SMF 405-1 that UE 105 is requesting a communication session, and/or is requesting EDS 109 locator information.

As similarly discussed above, the request (at 502) may include a PCO value or other request for locator information for one or more instances of EDS 109, and/or SMF 405-1 may otherwise identify that EDS 109 locator information should be provided to UE 105 in response to the request. SMF 303-1 may further identify that UE 105 is roaming, and/or may otherwise determine that network 101-2 is a home network with respect to UE 105. For example, SMF 405-1 may receive an indication from UE 105, a particular AMF 303 of network 101, and/or some other device or system that UE 105 is roaming with respect to network 101-1.

SMF 405-1 may accordingly output (at 504) a UE information request associated with UE 105 to SMF 405-2 of home network 101-2. In some embodiments, the UE information request may be, may include, or may be included in an Nsmf_PDUSession_Create Request or other suitable type of message sent between networks 101-1 and 101-2. In some embodiments, the UE information request may include a PCO value or other suitable flag, indicator, etc. indicating that EDS 109 locator information is being requested from network 101-2. As noted above, SMF 405-2 may maintain, receive, monitor, etc. EDS locator information 401-2, associated with EDS 109-2 with which network 101-2 is associated. In some embodiments, SMF 405-2 may request and/or otherwise receive EDS locator information 401-2 from a UDM or other suitable source associated with network 101-2.

Accordingly, SMF 405-2 may provide (at 506) the requested UE information, which may be provided via a Nsmf_PDUSession_Create Response or other suitable type of message. Such message may include, for example, the requested EDS locator information 401-2 associated with network 101-2 (e.g., locator information for EDS 109-2). SMF 405-1 may accordingly output (at 508) a communication session response, which includes EDS locator information 401-2 obtained from network 101-2 as well as EDS locator information 401-1 associated with network 101-1. As similarly noted above, such response may be provided via a particular AMF 303 associated with network 101-1, and/or AMF 303 may provide some other type of response to UE 105 that includes EDS locator information 401-1 and 401-2.

In some embodiments, UE 105 may update information at edge discovery client 201 to reflect the received EDS locator information 401-1 and/or 401-2. UE 105 may accordingly use (at 510) EDS locator information 401-1 and 401-2 to output service requests to EDS 109-1 and/or 109-2. In some embodiments, EDS 109-1 may select a particular MEC 303 associated with network 101-1, and EDS 109-2 may select a particular MEC 303 associated with network 101-2, and UE 105 may select a particular one of such MECs 303 in order to receive a particular service 107.

Figure 6:
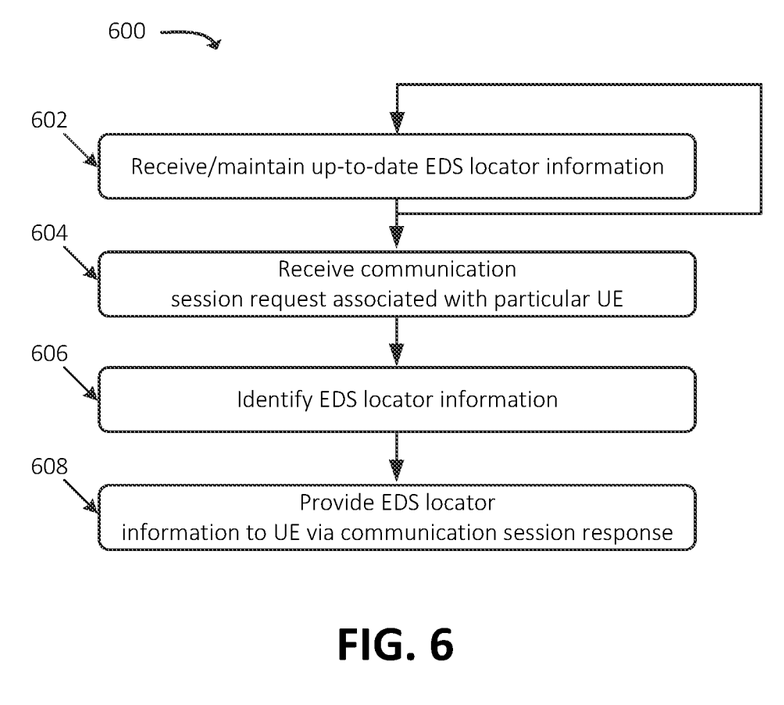
FIG. 6 illustrates an example process for providing up-to-date edge discovery system locator information to a UE, in accordance with some embodiments.

FIG. 6 illustrates an example process 600 for providing up-to-date edge discovery system locator information to UE 105, in accordance with some embodiments. In some embodiments, some or all of process 600 may be performed by AMF 303. In some embodiments, one or more other devices may perform some or all of process 600 in concert with, and/or in lieu of, AMF 303.

As shown, process 600 may include receiving and/or maintaining (at 602) up-to-date locator information associated with EDS 109. For example, as discussed above, AMF 303 may receive such locator information for EDS 109, which maintains information (e.g., rules, policies, locator information, etc.) associated with one or more edge devices (e.g., MECs 103 or other types of devices) associated with network 101. AMF 303 may receive, for example, the locator information from ELS 301 (e.g., via NEF 403), SMF 405, a UDM, and/or from some other suitable source. In some embodiments, AMF 303 may receive the locator information on an ongoing basis, such that AMF 303 maintains or otherwise receives up-to-date locator information for EDS 109.

Process 600 may further include receiving (at 604) a communication session request associated with a particular UE 105. For example, UE 105 may have outputted the communication session request (e.g., via a PDU Session Establishment Request message or other suitable message), and/or some other device or system may have outputted the communication session request (e.g., a device or system facilitating or initiating a communication session for which UE 105 is an endpoint, such as an application server, another UE 105, etc.). In some embodiments, the communication session request may include a PCO value indicating that locator information for EDS 109 is being requested in conjunction with the communication session request.

Process 600 may additionally include identifying (at 606) the requested locator information for EDS 109. For example, AMF 303 may identify previously received (at 602) locator information. Additionally, or alternatively, AMF 303 may output a request to SMF 405 for the locator information. For example, AMF 303 may include a request for such locator information within a message to SMF 405, requesting establishment of a PDU session or other type of communication session. In some embodiments, AMF 303 may output a request to ELS 301 (e.g., via NEF 403) and/or some other suitable device or system for the locator information associated with EDS 109.

Process 600 may also include providing (at 608) the requested locator information to UE 105. For example, as discussed above, the locator information for EDS 109 may be included in a communication session response, such as a PDU Session Establishment Response. In this manner, the locator information for EDS 109 may be requested by UE 105, and provided to UE 105, without introducing additional messages to the session establishment procedure. For example, in some embodiments, the same messages used to establish a communication session between UE 105 and network 101 may include a request for locator information for EDS 109 as well as the requested locator information. As discussed above, UE 105 may use the locator information to communicate with EDS 109, and process 600 may be used to ensure that UE 105 receives up-to-date locator information for EDS 109 in the event that such locator information changes (e.g., due to configuration changes, failover events, scaling up of EDS 109, etc.).

Figure 7:
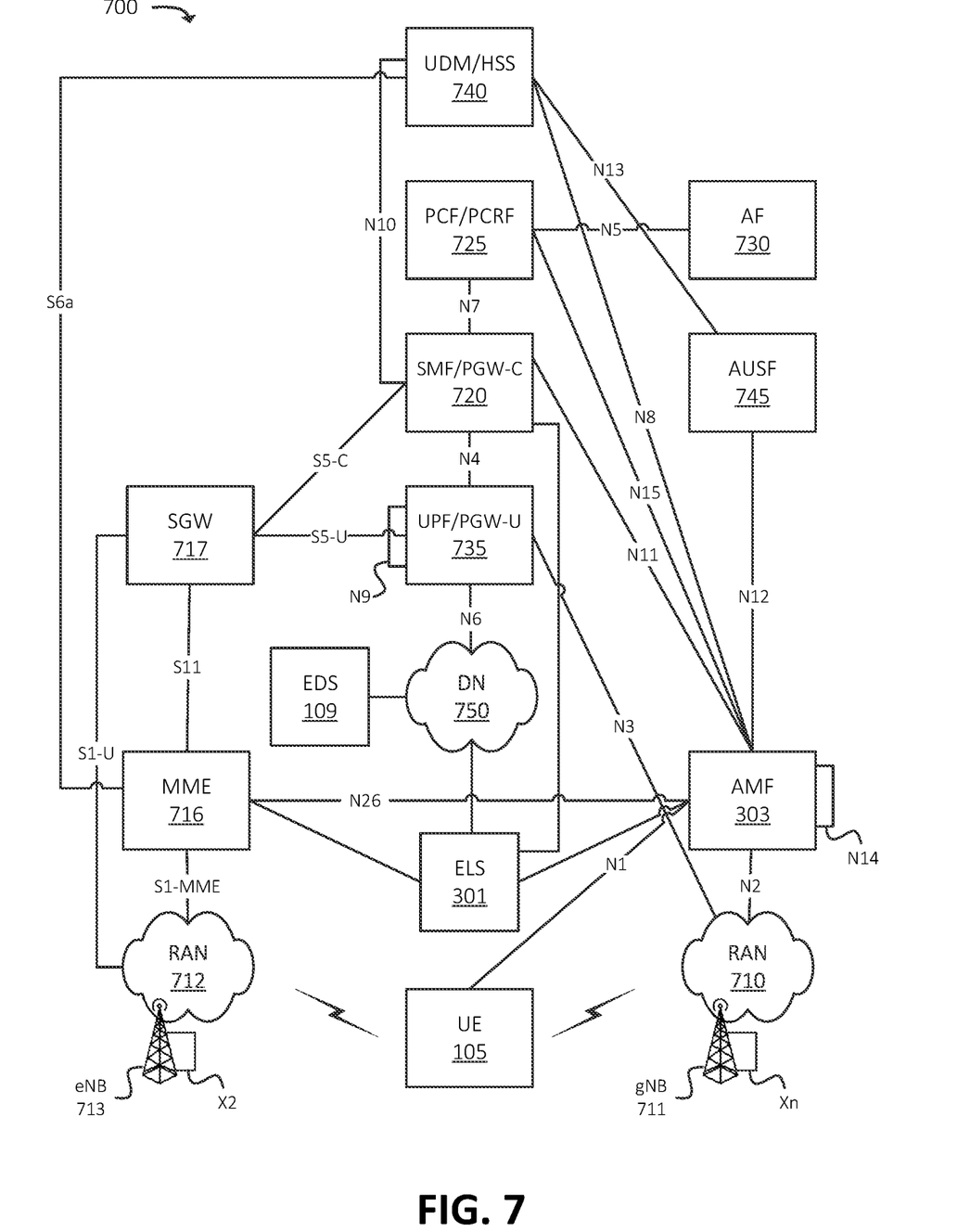
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 105, RAN 710 (which may include one or more Next Generation Node Bs ("gNBs") 711), RAN 712 (which may include one or more evolved Node Bs ("eNBs") 713), and various network functions such as AMF 303, Mobility Management Entity ("MME") 716, Serving Gateway ("SGW") 717, SMF/Packet Data Network PGW-Control plane function ("PGW-C") 720, Policy Control Function ("PCF")/Policy Charging and Rules Function ("PCRF") 725, Application Function ("AF") 730, UPF/PGW-User plane function ("PGW-U") 735, UDM/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as EDS 109 and/or ELS 301.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700. In some embodiments, environment 700 may include, implement, may be implemented by, may be communicatively coupled to, and/or may otherwise be associated with network 101.

UE 105 may include a computation and communication device, such as a wireless mobile communication device that is capable of communicating with RAN 710, RAN 712, and/or DN 750. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 105 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 105 may communicate with one or more other elements of environment 700. UE 105 may communicate with RAN 710 via an air interface (e.g., as provided by gNB 711). For instance, RAN 710 may receive traffic (e.g., voice call traffic, data traffic, messaging traffic, signaling traffic, etc.) from UE 105 via the air interface, and may communicate the traffic to UPF/PGW-U 735, and/or one or more other devices or networks. Similarly, RAN 710 may receive traffic intended for UE 105 (e.g., from UPF/PGW-U 735, AMF 303, and/or one or more other devices or networks) and may communicate the traffic to UE 105 via the air interface.

RAN 712 may be, or may include, a LTE RAN that includes one or more base stations (e.g., one or more eNBs 713), via which UE 105 may communicate with one or more other elements of environment 700. UE 105 may communicate with RAN 712 via an air interface (e.g., as provided by eNB 713). For instance, RAN 712 may receive traffic (e.g., voice call traffic, data traffic, messaging traffic, signaling traffic, etc.) from UE 105 via the air interface, and may communicate the traffic to UPF/PGW-U 735, and/or one or more other devices or networks. Similarly, RAN 712 may receive traffic intended for UE 105 (e.g., from UPF/PGW-U 735, SGW 717, and/or one or more other devices or networks) and may communicate the traffic to UE 105 via the air interface.

AMF 303 may include one or more devices, systems, Virtualized Network Functions ("VNFs"), Cloud-Native Network Functions ("CNFs"), etc., that perform operations to register UE 105 with the 5G network, to establish bearer channels associated with a session with UE 105, to hand off UE 105 from the 5G network to another network, to hand off UE 105 from the other network to the 5G network, manage mobility of UE 105 between RANs 710 and/or gNBs 711, and/or to perform other operations. In some embodiments, the 5G network may include multiple AMEs 303, which communicate with each other via the N14 interface (denoted in FIG. 7 by the line marked "N14" originating and terminating at AMF 303).

MME 716 may include one or more devices, systems, VNFs, CNFs, etc., that perform operations to register UE 105 with the EPC, to establish bearer channels associated with a session with UE 105, to hand off UE 105 from the EPC to another network, to hand off UE 105 from another network to the EPC, manage mobility of UE 105 between RANs 712 and/or eNBs 713, and/or to perform other operations. In some embodiments, MME 716 or some other suitable network element may perform some or all of the operations described above with respect to AMF 303.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 105. In some embodiments, the establishment of communications sessions may be performed in accordance with one or more policies provided by PCF/PCRF 725. In some embodiments, SMF 405 may be, may include, and/or may be implemented by one or more SMF/PGW-C 720. In some embodiments, SMF/PGW-C 720, a PGW-C, or some other suitable network element may perform some or all of the operations described above with respect to SMF 405.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 105, from DN 750, and may forward the user plane data toward UE 105 (e.g., via RAN 710, SMF/PGW-C 720, and/or one or more other devices). In some embodiments, multiple UPFs 735 may be deployed (e.g., in different geographical locations), and the delivery of content to UE 105 may be coordinated via the N9 interface (e.g., as denoted in FIG. 7 by the line marked "N9" originating and terminating at UPF/PGW-U 735). Similarly, UPF/PGW-U 735 may receive traffic from UE 105 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 105.

DN 750 may include one or more wired and/or wireless networks. For example, DN 750 may include an IP-based PDN, a wide area network ("WAN") such as the Internet, a private enterprise network, and/or one or more other networks. UE 105 may communicate, through DN 750, with data servers, other UEs 105, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 105 may communicate.

Figure 8:
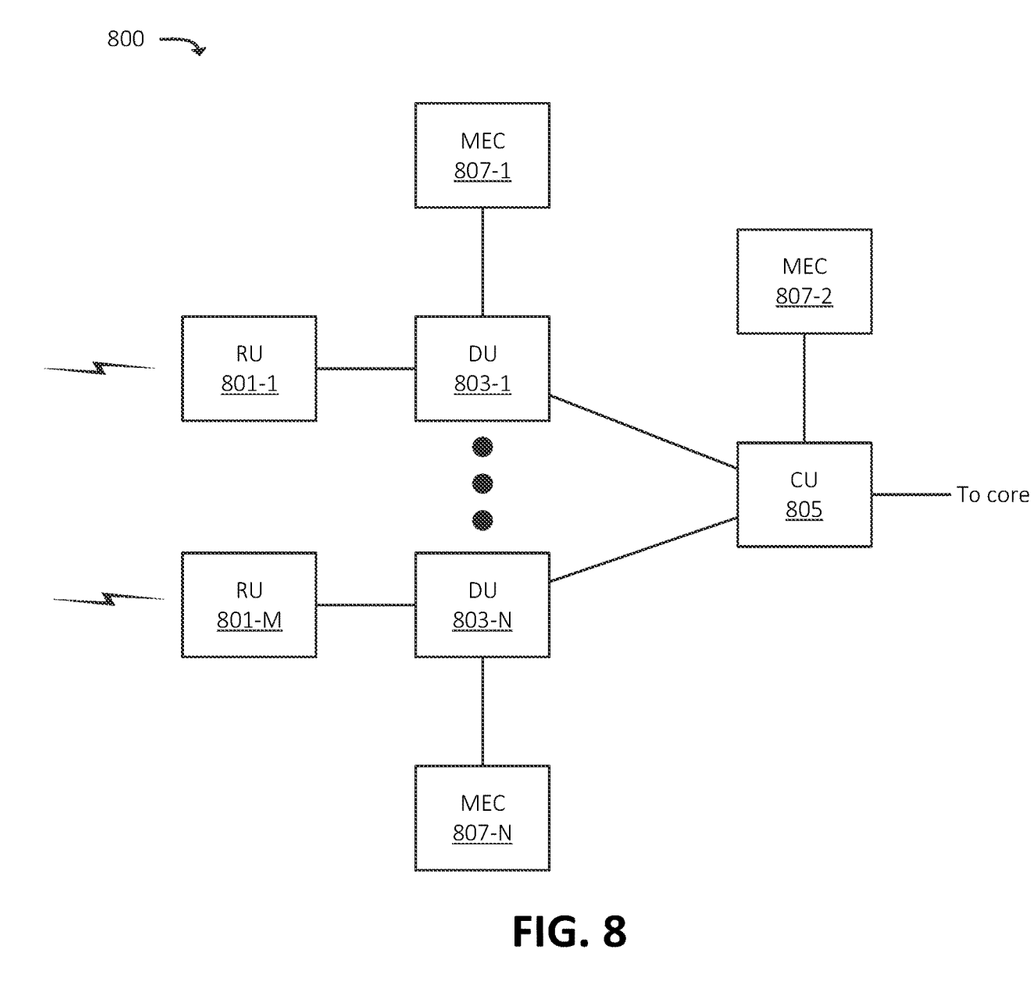
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 710, RAN 712, or some other RAN). In some embodiments, a particular RAN may include one RAN environment 800. In some embodiments, a particular RAN may include multiple RAN environments 800. In some embodiments, RAN environment 800 may correspond to a particular gNB 711 of a 5G RAN (e.g., RAN 710). In some embodiments, RAN environment 800 may correspond to multiple gNBs 711. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 303 and/or UPF/PGW-U 735). In the uplink direction (e.g., for traffic from UEs 105 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 105, and may determine which DU(s) 803 should receive the downlink traffic. DU 803 may include one or more devices that transmit traffic between a core network (e.g., via CU 805) and UE 105 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 105.

RU 801 may include hardware circuitry (e.g., one or more RF transceivers, antennas, radios, and/or other suitable hardware) to communicate wirelessly (e.g., via an RF interface) with one or more UEs 105, one or more other DUs 803 (e.g., via RUs 801 associated with DUs 803), and/or any other suitable type of device. In the uplink direction, RU 801 may receive traffic from UE 105 and/or another DU 803 via the RF interface and may provide the traffic to DU 803. In the downlink direction, RU 801 may receive traffic from DU 803, and may provide the traffic to UE 105 and/or another DU 803.

One or more elements of RAN environment 800 may, in some embodiments, be communicatively coupled to one or more "MECs" 103. For example, DU 803-1 may be communicatively coupled to MEC 103-1, DU 803-N may be communicatively coupled to MEC 103-N, CU 805 may be communicatively coupled to MEC 103-2, and so on. MECs 103 may include hardware resources (e.g., configurable or provisionable hardware resources) that may be configured to provide services and/or otherwise process traffic to and/or from UE 105, via a respective RU 801.

For example, DU 803-1 may route some traffic, from UE 105, to MEC 103-1 instead of to a core network via CU 805. MEC 103-1 may process the traffic, perform one or more computations based on the received traffic, and may provide traffic to UE 105 via RU 801-1. In some embodiments, MEC 103 may include, and/or may implement, some or all of the functionality described above with respect to AF 730, UPF 735, and/or one or more other devices, systems, VNFs, CNFs, etc. In this manner, ultra-low latency services may be provided to UE 105, as traffic does not need to traverse DU 803, CU 805, links between DU 803 and CU 805, and an intervening backhaul network between RAN environment 800 and the core network.

Figure 9:
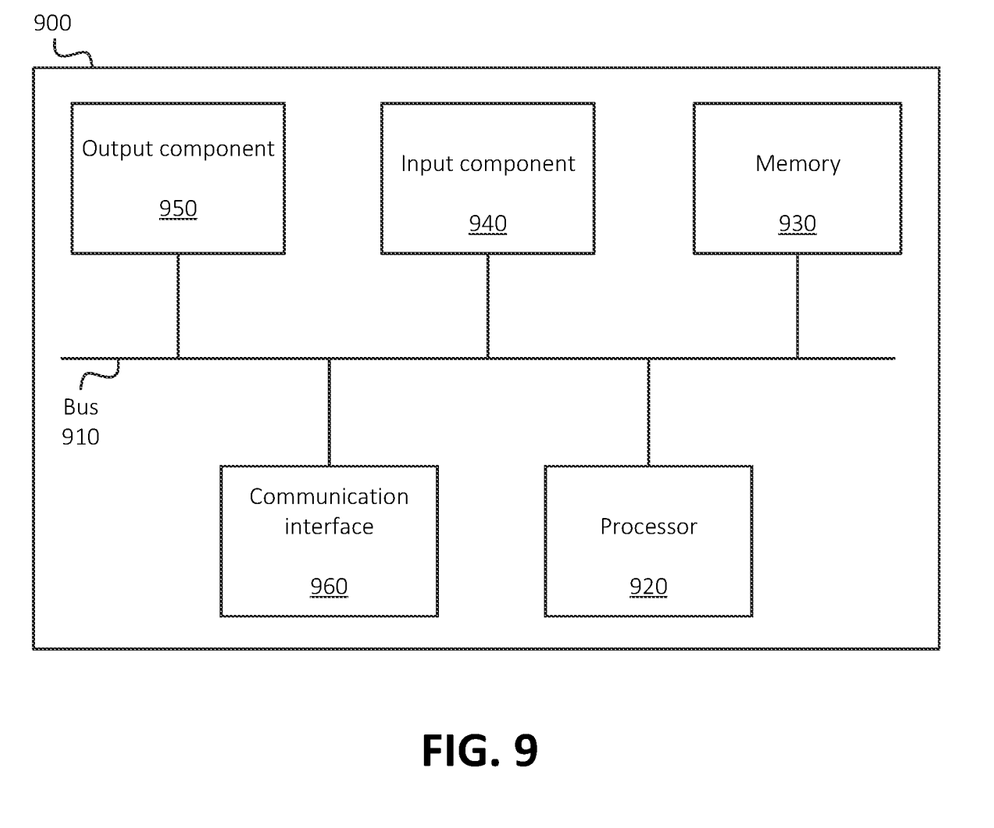
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a communication session request associated with a particular User Equipment ("UE"), wherein the communication session request includes a particular Protocol Configuration Options ("PCO") value indicating a request for locator information associated with an edge discovery system that is associated with a network that includes a plurality of edge devices;
identify the locator information associated with the edge discovery system, wherein the edge discovery system receives service requests associated with one or more UEs and provides an indication of a respective edge device of the plurality of edge device in response to respective service requests; and output, in response to the communication session request, the locator information associated with the edge discovery system, wherein the particular UE communicates with the edge discovery system using the locator information to output a particular service request and receive, from the edge discovery system, an indication of a particular edge device of the plurality of edge devices in response to the particular service request.

2. The device of claim 1, wherein the communication session request includes a protocol data unit ("PDU") Session Establishment Request.

3. The device of claim 1, wherein outputting the locator information includes outputting a protocol data unit ("PDU") Session Establishment Response that includes the locator information.

4. The device of claim 1, wherein outputting the locator information associated with the edge discovery system includes providing the same PCO value with the locator information.

5. The device of claim 1, wherein the communication session request is received via at least one of:
an N1 interface, or
Non-Access Stratum ("NAS") signaling.

6. The device of claim 1, wherein identifying the locator information includes:
requesting, after receiving the communication session request, the locator information from a Session Management Function ("SMF"); and
receiving the locator information from the SMF.

7. A non-transitory computer-readable medium, storing a plurality of processor-executable instructions to:
receive a communication session request associated with a particular User Equipment ("UE"), wherein the communication session request includes a particular Protocol Configuration Options ("PCO") value indicating a request for locator information associated with an edge discovery system that is associated with a network that includes a plurality of edge devices;
identify the locator information associated with the edge discovery system, wherein the edge discovery system receives service requests associated with one or more UEs and provides an indication of a respective edge device of the plurality of edge device in response to respective service requests; and
output, in response to the communication session request, the locator information associated with the edge discovery system, wherein the particular UE communicates with the edge discovery system using the locator information to output a particular service request and receive, from the edge discovery system, an indication of a particular edge device of the plurality of edge devices in response to the particular service request.

8. The non-transitory computer-readable medium of claim 7, wherein the communication session request includes a protocol data unit ("PDU") Session Establishment Request.

9. The non-transitory computer-readable medium of claim 7, wherein outputting the locator information includes outputting a protocol data unit ("PDU") Session Establishment Response that includes the locator information.

10. The non-transitory computer-readable medium of claim 7, wherein outputting the locator information associated with the edge discovery system includes providing the same PCO value with the locator information.

11. The non-transitory computer-readable medium of claim 7, wherein the communication session request is received via at least one of:
an N1 interface, or
Non-Access Stratum ("NAS") signaling.

12. The non-transitory computer-readable medium of claim 7, wherein identifying the locator information includes:
requesting, after receiving the communication session request, the locator information from a Session Management Function ("SMF"); and
receiving the locator information from the SMF.

13. A method, comprising:
receiving a communication session request associated with a particular User Equipment ("UE"), wherein the communication session request includes a particular Protocol Configuration Options ("PCO") value indicating a request for locator information associated with an edge discovery system that is associated with a network that includes a plurality of edge devices;
identifying the locator information associated with the edge discovery system, wherein the edge discovery system receives service requests associated with one or more UEs and provides an indication of a respective edge device of the plurality of edge device in response to respective service requests; and
outputting, in response to the communication session request, the locator information associated with the edge discovery system, wherein the particular UE communicates with the edge discovery system using the locator information to output a particular service request and receive, from the edge discovery system, an indication of a particular edge device of the plurality of edge devices in response to the particular service request.

14. The method of claim 13, wherein the communication session request includes a protocol data unit ("PDU") Session Establishment Request.

15. The method of claim 13, wherein outputting the locator information includes outputting a protocol data unit ("PDU") Session Establishment Response that includes the locator information.

16. The method of claim 13, wherein outputting the locator information associated with the edge discovery system includes providing the same PCO value with the locator information.

17. The method of claim 13, wherein the communication session request is received via at least one of:
an N1 interface, or
Non-Access Stratum ("NAS") signaling.

18. The method of claim 13, wherein identifying the locator information includes:
requesting, after receiving the communication session request, the locator information from a Session Management Function ("SMF"); and
receiving the locator information from the SMF.

19. The method of claim 13, wherein the locator information associated with the edge discovery system includes an Internet Protocol ("IP") address associated with the edge discovery system.

20. The device of claim 1, wherein the locator information associated with the edge discovery system includes an Internet Protocol ("IP") address associated with the edge discovery system.

* * * * *